Nov. 10, 1964 J. B. PAMPLIN 3,156,158
ROTARY FLUID DISPLACEMENT APPARATUS
Filed Aug. 20, 1959 2 Sheets-Sheet 1
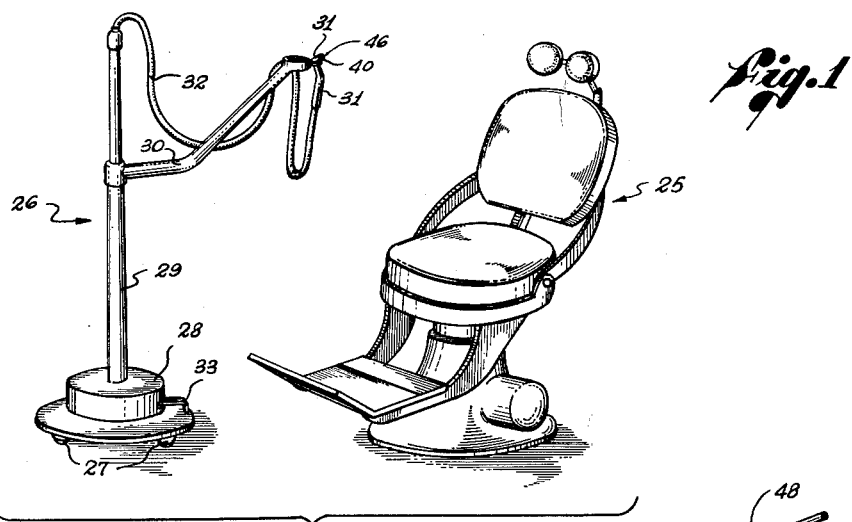
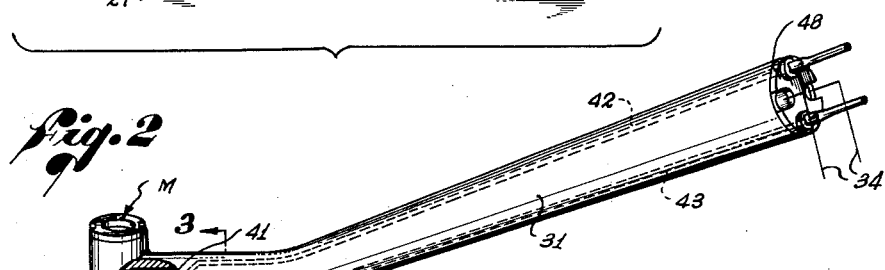
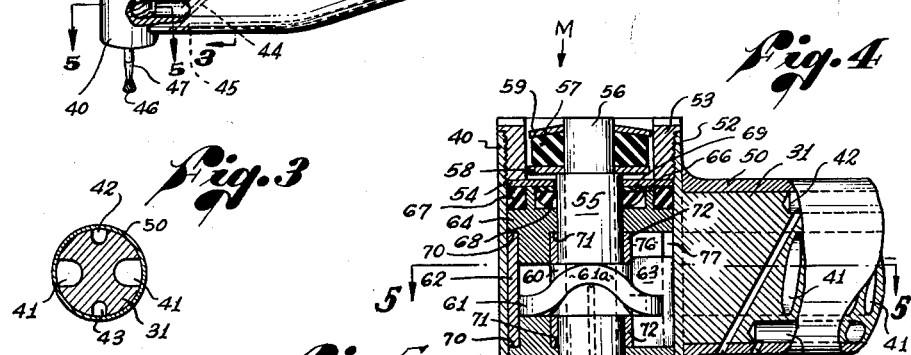
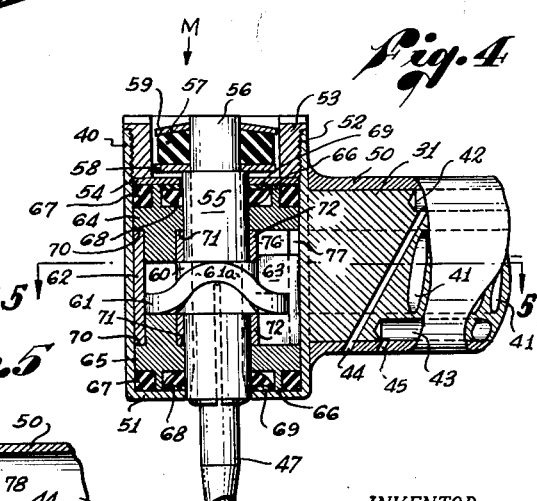
INVENTOR.
JAMES B. PAMPLIN

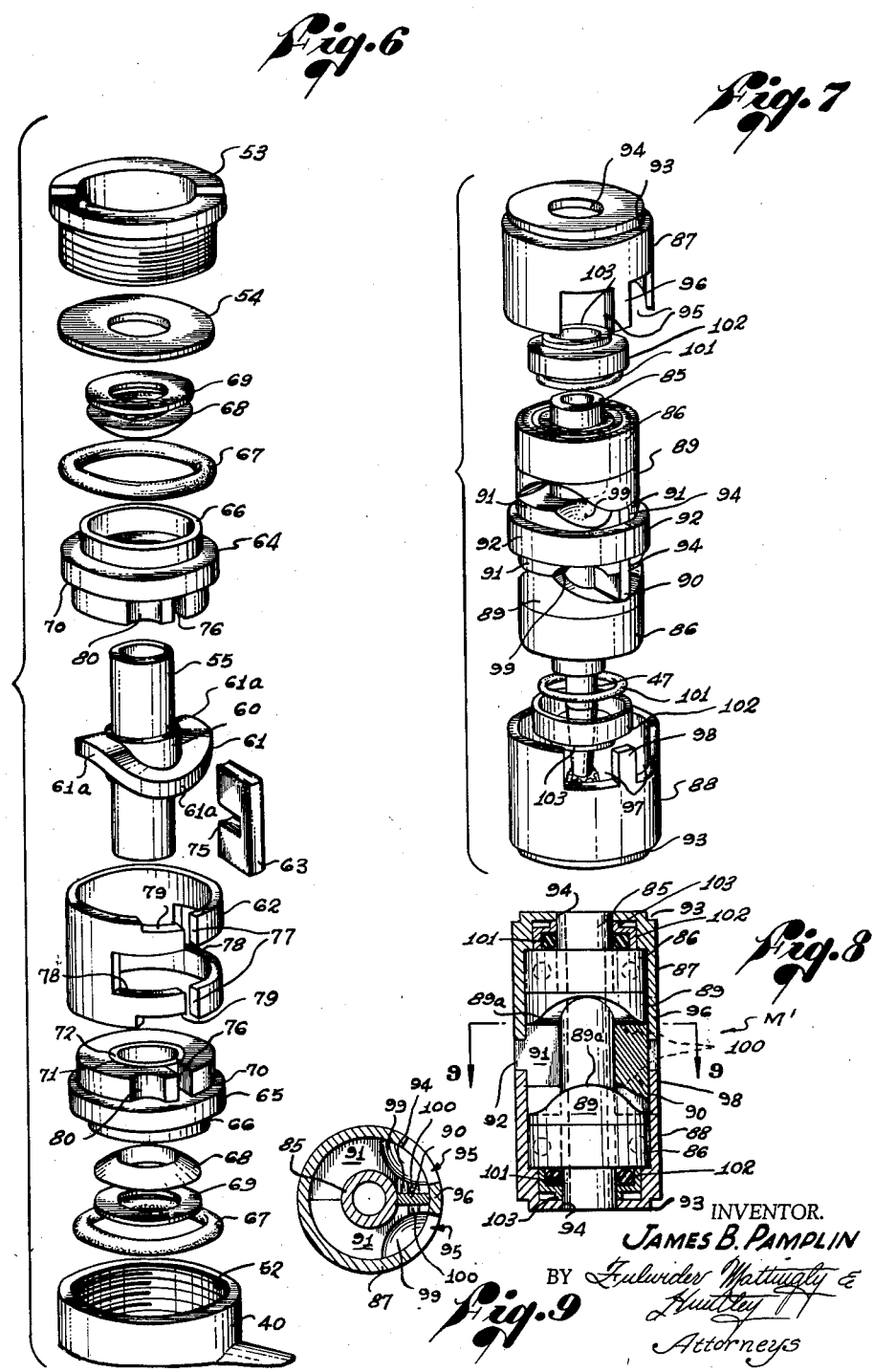

United States Patent Office 3,156,158
Patented Nov. 10, 1964

3,156,158
ROTARY FLUID DISPLACEMENT APPARATUS
James B. Pamplin, 11612 Morgan Lane,
Garden Grove, Calif.
Filed Aug. 20, 1959, Ser. No. 835,117
6 Claims. (Cl. 91—96)

The present invention relates to rotary fluid displacement apparatus and particularly to apparatus of this type which can be adapted for use as a pump, motor or meter.

An object of my invention is to provide rotary fluid apparatus of the positive displacement type particularly suited for dental drilling devices. However, in the following description it should be borne in mind that although my invention is disclosed as embodied in a dental drill device (wherein it has special utility), its use is not limited to this field, but is adaptable to other applications. Furthermore, it will also be apparent that the invention can be utilized with both liquid and gaseous displaceable fluid media.

A further object of the invention is to provide a rotary fluid displacing apparatus adapted to provide extremely high rates of speed of a rotor shaft.

Another object of the invention is to provide apparatus of this type adapted for use in dental drilling devices to improve the quietness and freedom from vibration of such devices by elimination of belt or air drives which induce noise, resonance, and vibration.

A further object of the invention is to provide apparatus of this type including a fluid motor device whose output shaft is adapted for coaxially supporting a collet chuck or like tool holder in which a cutting burr or other tool can be held.

Yet another object of the invention is to provide a rotary fluid displacement apparatus particularly adapted for miniaturization so as to be usable in dental drilling apparatus or the like.

An additional object of the invention is to provide an apparatus of this type including an output rotor assembly of minimum mass for attaining extremely high speeds and also to provide an assembly of this type adapted for replacement as a unit.

Another object of the invention is to provide generally improved rotary fluid displacement apparatus that is relatively simple to manufacture and particularly adapted to provide a long service life.

These and other objects and advantages of my invention will be apparent from the following description of several embodiments thereof when taken in conjunction with the annexed drawings in which:

FIGURE 1 is a perspective view of a dental drilling device comprising a patient's chair and movable pedestal and incorporating rotary fluid displacement apparatus of my invention;

FIGURE 2 is a perspective view of the handpiece of the dental drilling device shown in FIGURE 1, with a portion thereof cut away in order to illustrate interior details of construction;

FIGURE 3 is a sectional view of a portion of the handpiece taken on the line 3—3 of FIGURE 2;

FIGURE 4 is an axial sectional view of one embodiment of motor incorporated in the free end of the handpiece of FIGURE 2, shown on an enlarged scale;

FIGURE 5 is a sectional view taken on the line 5—5 of FIGURE 4;

FIGURE 6 is an exploded perspective view of the several parts incorporated in the motor device of FIGURE 4, showing interior details of construction of the several parts;

FIGURE 7 is a partly exploded perspective view of an alternative form of motor device;

FIGURE 8 is an axial sectional view showing the assembled relationship of the several parts of FIGURE 7;

FIGURE 9 is a sectional view taken on the line 9—9 of FIGURE 8.

To illustrate an application wherein the invention has special utility, FIGURE 1 shows a dental drilling apparatus broadly comprising a patient's chair 25 and a pedestal 26. Unlike conventional arrangements wherein the pedestal is permanently affixed to the floor, the pedestal 26 on its base is provided with castered wheels 27. Thus, the pedestal 26 and the equipment thereon can be moved freely relative to the chair 25, and the advantages of this flexible arrangement will be apparent to doctors of dental science.

A complete apparatus for operating a dentist's tool is substantially entirely contained in the pedestal 26. This apparatus includes a pump means, a dentists's handpiece with a motor device for turning a dentist's burr or drill, and a circuit means for pump and a reservoir.

The pedestal 26 includes a base housing 28 for containing an electric motor, pump and reservoir. A column 29 surmounts the housing 28 and in turn supports an outwardly extending arm 30 on the free end of which a dentist's handpiece 31 can be removably supported. A flexible sheath 32 extends between the handpiece 31 and the upper end of the column 29 and serves to protectively encase flexible conduits providing the fluid circuit between the motor device in the handpiece 31 and the pump in the housing 28. The flexible sheath 32 can also enclose air and water lines, all of these lines and conduits extending through the column 29 into the base, from which point the water and air lines can be connected to exterior sources of supply. Although not shown, an electrical line cord extends from the electric motor in housing 28 for connection to a wall plug. An extensible foot control 33 protrudes outwardly from the housing 28 for operation of the motor in the handpiece 31.

The system includes a motor device M, such as is shown in detail in FIGURES 4 through 6, and a pump, not shown, the pump and motor device being operatively interconnected in a circuit. This circuit includes a pair of flexible conduits 34 extending between the motor M and pump and a pair of conduits 35 interconnecting the pump to a fluid supply tank. It will be understood that the pair of conduits 34 are adapted to be enclosed at one end in the protective sheath 32.

The motor M is mounted in the free end of the handpiece 31, the handpiece terminating in a cylindrical housing 40 for this purpose. For conducting the actuating fluid to and from the motor M, the handpiece 31 is formed with a pair of diametrically opposite axially extending passageways 41 that open into communication with the interior of the housing 40 at one end. At the other end of these passages the pair of flexible conduits 34, encased within the sheath 32, serve to communicate the passages 41 with the inlet and outlet ports of the pump P.

The handpiece 31 is also formed with another pair of axially extending smaller passages 42 and 43. Both of these small passages extend from the rear end of the handpiece towards the housing 40 and are disposed within a diametrical plane including the material of the handpiece 31 that separates the two other passages 41. At their front ends the passages 42 and 43 communicate with orifices 44 and 45, respectively, that are angularly disposed relative to the axis of the housing 40, this angle being such that the orifices are directed towards the burr 46 of a drill 47 drivingly mounted in the motor M. One of these small passages serves to conduct water while the other conducts air, the water and air commingling as they leave the orifices 44 and 45 to provide a cooling spray on the burr 46 and the tooth being operated on. At its rear end the handpiece 31 has a cap 48 affixed thereto to provide means for connecting air and water lines to the passages 42 and 43, as well as a mounting means for connecting the conduits 34 to the larger pair of passages 41.

The rotary motor M of FIGURES 4–6 is of the reversible, variable-speed type incorporating a slidable abutment for separating the inlet and outlet to the motor. Motors of this general type are well known in the art, but my improved motor is particularly well adapted for high-speed operation while truly coaxially mounting and driving a cutting tool, as well as providing pulsation-free running at all speeds.

The housing 40 of the handpiece at its lower end is formed with an annular floor 51 on which the assembled motor M can be seated, and has a central opening adapted to receive the lower end of a hollow rotor shaft 55. At its upper end the motor housing 40 is internally threaded, as indicated at 52, to receive a ring nut 53 that is adapted for tightening with a small spanner wrench or the like, and an annular retainer disc 54 is slidably receivable within the housing 40 under the nut 53. By suitable rotation of the nut 53, the entire motor assembly can be rigidly clamped in place between the disc 54 and the housing floor 51 to maintain the motor assembly in the proper angular position relative to the pair of passages 41. The central opening in the retainer 54 is adapted to receive the upper end of the rotor shaft of motor M.

The rotor shaft 55 is adapted to coaxially receive a small collet chuck 56 through its lower end, in which the burr stem 47 can be received. The upper end of this chuck extends above the upper end of the shaft 55 and mounts a rubber ring 57 sandwiched between a washer 58 and a lock washer 59. To open the jaws of the chuck 56 it is pushed downwardly, which results in compression of the rubber ring 57. After a burr stem 47 has been placed into or removed from the chuck, release of the chuck allows the ring 57 to rebound from the washer 58 against the lock washer 59 which pulls the chuck back into the shaft 55.

The rotor shaft 55 has an enlarged diameter mid-section 60 on which a multiple lobe, circumferentially extending cam element 61 is formed. The motor assembly also includes a generally cylindrical member 62 for slidably supporting a reciprocating abutment 63, and a pair of bearings 64 and 65, that in conjunction with the enlarged section 60 of the rotor define an annular work compartment in which the cam element 61 rotates.

As an examination of FIGURE 4 will show, the member 62 and bearing members 64 and 65 are tightly clamped between the housing floor 51 and the disc 54. All of these parts are thereby held against angular movement, and the member 62, in turn, is adapted to constrain the slidable abutment 63 in its desired position to separate the pair of passages 41. The bearing members 64 and 65 are also adapted to provide seats for fluid sealing means at opposite ends of the motor assembly. The manner in which each of these several parts is adapted for these purposes can best be seen in FIGURE 6.

Since the bearings 64 and 65 are mirror images, but one of them will be described in detail, it being understood that the other has correspondingly configured portions identified by corresponding numerals. Thus, these bearings on their axially outer ends are formed with a concentric cylindrical flange or wall 66 adapted to exteriorly seat an elastomeric seal ring 67. Within the cylindrical wall 66 a smaller seal ring 68 is seated in fluid sealing engagement with an end of the rotary shaft 55. A plastic washer, preferably of Teflon or like material, coaxially surmounts the seal ring 68.

On its axially inner end, each of the bearing members 64 and 65 is formed with a peripheral annular shoulder 70 having a radial dimension equivalent to the wall thickness of the material of the member 62. The opposite ends of the member 62 are seated in these shoulders 70 and maintain the bearing members 64 and 65 spaced apart an axial distance corresponding to the axial dimension of the work chamber in which the impeller cam element 61 are also counterbored, as indicated at 71, to receive Babrotates. The axially inner ends of the members 64 and 65 bitt bearing rings 72, having the same outer diameter as the diameter of the enlarged section 60 of the rotor shaft 55 to hold the shaft against axial displacement.

The impeller cam 61 is of uniform axial thickness and has a diameter which will give a close-running fit within the member 62. The cam element includes four uniformly spaced lobes 61a so that the annular pump chamber is divided into four equal compartments of graduated volume, there being two compartments on each side of the cam 61.

The abutment 63 is formed with a central slot 75 opening into its radially inner edge and adapted to receive the cam 61 therein. This slot has a depth equivalent to the radial width of the cam 61 so that the radially inner edge of the abutment 63 rides on the enlarged section 60 of the rotor shaft 55. In order to hold the abutment 63 against planetary movement around the rotor shaft, the confronting ends of the bearing members 64 and 65 are formed with pockets 76 adapted to register with slits 77 formed in the member 62. The abutment 63 is thus axially slidable between the shoulders 70 of the bearings 64 and 65 in response to rotation of cam element 61, while being held in a position to separate the two passages 41 by the slits 77 of the member 62, and the pockets 76 of the bearing members 64 and 65.

The cam 61 divides the annular pump chamber into four equal cavities of graduated volume and each of these cavities, as it passes abutment 63, gradually passes through registration with the pair of fluid passage 41 in succession, to exhaust and then intake the fluid driving medium through ports 78 in member 62 that register with the passages 41.

The opposite pockets 76 and opposite pair of slits 77 support the abutment member 63 in exact axial co-alignment with the shaft 55. For relieving the opposite ends of the working space in which the abutment 63 reciprocates, the member 62 is formed with a pair of relief slots 79, each of which leads into one of the slits 77, while the members 64 and 65 are each formed with a cavity 80 extending axially from one end of a relief slot 79 into the annular work chamber. With this arrangement, fluid displaced by an end of abutment 63 as it reciprocates is bled into the work chamber to avoid any locking of the abutment member. It will be observed that this bleeding can occur irrespective of the direction of rotation of the shaft 55.

It will be apparent from the arrangement just described that replacement of the motor M as an assembled unit is possible. In this connection, particular attention is directed to the mounting for the abutment 63. It will be noted that the inner wall of the housing 40 need not be specially adapted for supporting the abutment 63. So long as care is taken in mounting the motor within the housing 40 to insure that the abutment 63 is aligned with the wall portion of the housing 40 disposed between the pair of passages 41, the motor M wil be disposed in the proper angular relationship relative to the passages 41. It will also be noted that the mass of the moving parts has been held to a minimum whereby a high speed of rotation of the shaft 55 can be attained. The provision of the plurality of lobes 61a on the impeller cam 61 allows the shaft 55 to be turned without pulsation, at any speed, in view of the fact that each of the work compartments or spaces on both sides of the cam 61 is gradually divided by the abutment member 63. It will also be noted that irrespective of the angular position of the cam 63 relative to the pair of passages 41, the intake and exhaust rates of fluid flow in the passages 41 are precisely equal.

An alternative form of motor, designated generally by the letter M′, is shown in FIGURES 7–9. This motor, like the motor M, is adapted for removable mounting within the housing 40 as an assembled unit.

Motor M' includes a rotor shaft 85 that is hollow for the reception of a collet (not shown) in which the burr shank 47 can be held. Adjacent its opposite ends, the rotor 85 mounts a pair of ball bearings 86, each of which has its inner race drivingly engaged with the rotor 85, as by a force fit. The outer races of each ball bearing 86 are adapted for a snug fit within one of a pair of generally cup-shaped members 87 and 88.

Just axially inwardly of the pair of ball bearings 86, the rotor 85 is integrally formed with a pair of confronting scroll cam surfaces 89, each of which has a circumference adapted for a close running fit within the pair of members 87 and 88. The confronting ends of the scroll cams 89 are each formed with a pair of diametrically opposite lobes 89a. It will be observed that the confronting cam surfaces are complementary arranged so as to define an annular sinuous cavity of a uniform width axial therebetween.

A substantially rectangular abutment 90, having the same length as the axial width of the sinuous passage between the scroll cams 89, is held in place for reciprocation by a pair of substantially semi-cylindrical mounting members 91 that have integral half-rings 92 adapted to be clamped between confronting ends of the members 87 and 88. The members 87 and 88 and the half-rings 92 are adapted for a snug fit within the handpiece housing 40 and the whole clamped together against the floor of the housing by a nut 53 or the like. Both of the members 87 and 88 at their axially outer ends are formed with annular shoulders 93 adapted to seat an elastomeric O-ring seal or the like. As is shown in FIGURE 8, the assembled members 87, 88 and 92 have a combined length substantially equal to the length of the rotor 85 whose opposite ends are preferably journaled in complementary bores 94 formed in the ends of the members 87 and 88.

The two mounting members 91 have a circumference of less than 360 degrees inwardly of the half-rings 92 so that a slot 94 is defined between one pair of adjacent ends adapted to axially slidably support the abutment 90 therein. The pair of half-rings 92, however, together define a full 360 degrees so as to extend around the abutment 90 and prevent displacement of the abutment in a radial direction.

The pair of mounting members 91 have an axial length which is the same as the axial distance between the lobes 89a and also define a center hole in which the rotor 85 has a close running fit. With this arrangement, a pair of distinct and separate annular work chambers are defined between opposite sides of the pair of members 91 and the pair of ball bearings 86, in which the scroll cams 89 rotate under the influence of the impelling fluid.

As is shown in FIGURE 7, the pair of members 87 and 88 are adapted to pass fluid from the pair of passages 41 in the handpiece to axially opposite sides of the pair of mounting members 91. For this purpose, the upper member 87 has a pair of ports 95 formed therein on opposite sides of a dividing rib 96. Similarly, the lower member 88 has a pair of ports 97 divided by a rib 98. It will be noted that when the members 87 and 88 are in assembled relationship, their ribs and ports are aligned with one another and divided by the pair of half-rings 92. As is shown in FIGURE 8, the ribs 96 and 98 overlie the outer edge of the abutment 90.

Each handpiece passage 41 registers with both a port 95 and a port 97 so that fluid flows between each passage and both sides of the pair of members 91, that is, into both work chambers. As will be apparent, in the operation of the device the abutment 90 reciprocates in response to the rotation of the scroll cams 89. Each scroll cam 89 defines a pair of chambers of graduated volume with respect to the pair of mounting members 91 and each of these work chambers, as it passes the abutment 90, is caused to gradually empty into one passage 41 and is then gradually filled by fluid from the other passage 41.

In order to insure free reciprocation of the abutment 90, each mounting member 91 at the end providing the slot 94 is formed with a relief means such as is shown in FIGURE 7. Each member 91, on axially opposite sides thereof adjacent the slot 94, is formed with a pair of pockets 99 offset from the slot and communicated to the slot with a pair of ducts 100, which can be seen in FIGURE 9. Each cavity 99 confronts either a port 95 or a port 97 so that when fluid is displaced by an end of the abutment 90 it can escape through the ducts 100 and cavities 99 through a port, or can be entrained along with fluid entering one of the ports 95 and 97.

In order to provide a fluid seal at opposite ends of the rotor 85 I employ a pair of O-rings 101, each of which is held within a retainer 102. Each O-ring and its retainer are coaxially mounted on an end of the rotor 85 in a space between one of the ball bearing assemblies 86 and a hardened end wall of one of the members 87 and 88. Each retainer 102 has an axially extending circular lip 103, also hardened, which rides on a hardened end wall, the retainers 102 being free running in the members 87 and 88. Each O-ring 101 is compressed when mounted in place and thus biases the retainer lip 103 against the adjacent hardened end wall, to form a seal therebetween adapted to stop fluid which may escape past the O-ring 101.

When the motor M' is in the assembled condition shown in FIGURE 8, it can readily be placed into or removed from the housing 40 as a unit, care being taken to insure that the abutment 90 is placed in the proper position between the pair of handpiece passages 41. It will be understood that the operation of the motor M' is substantially like that of the motor M.

While a variety of forms of the invention have been illustrated and described, other modifications will be apparent to those skilled in the art as falling within the scope and spirit of the invention as defined by the appended claims.

I claim:

1. Rotary fluid displacement apparatus comprising: a housing; a rotor journaled in said housing that is formed with a pair of confronting complementary impeller cam faces around a shaft of said rotor each of said cam faces having a plurality of lobes; an abutment-mounting member around said rotor shaft between said cam faces to define a work chamber between each of said cam faces and each of the axially opposite ends of said mounting member, said lobes of said cam faces being adapted to radially divide one of said chambers into at least two compartments; an abutment slidably supported by said mounting member and having an engagement with said cam faces adapted to translate rotation of said rotor into reciprocation of said abutment axially of said rotor, said abutment being adapted to radially divide each of said compartments as said compartments pass said abutment, a pair of ports in said housing immediately adjacent to and on opposite sides of said abutment, each of said ports having communication with both of said work chambers at the levels of both of the axially opposite ends of said mounting member whereby both of said ports are continuously open during rotation of said rotor, the lobes of each of said cam faces being spaced apart sufficiently such that when one of said lobes passes said blade, another of said lobes prevents direct passage of a motive fluid between said open ports and means in said housing engagable with said mounting member to prevent displacement of said mounting member to maintain said abutment in place between said ports.

2. Rotary fluid displacement apparatus comprising: a housing; a pair of bearings coaxially mounted in opposite ends of said housing, each of said bearings having an outer race fixed in said housing to rotatably support an inner race; a rotor mounted in said inner races of said bearings that is formed with a pair of confronting complementary impeller cam faces around a shaft of said rotor; an abutment mounting member around said rotor shaft between said cam faces to define a pair of work chambers between said cam faces and the axially opposite ends of said mounting member, each of said cam faces having a plurality of lobes to radially divide one of said work chambers into separate segmental compartments; an abutment blade slidably supported by said mounting member and having an engagement with both of said cam faces adapted to translate rotation of said rotor into reciprocation of said blade axially of said rotor, said blade being adapted to radially divide each of said compartments as said compartments pass said abutment blade, a pair of ports in said housing immediately adjacent to and on opposite sides of said abutment, each of said ports having communication with both of said work chambers at the levels of both of the axially opposite ends of said mounting member whereby both of said ports are continuously open during rotation of said rotor, the lobes of each of said cam faces being spaced apart sufficiently such that when one of said lobes passes said blade, another of said lobes prevents direct passage of a motive fluid between said open ports and means in said housing to prevent displacement of said mounting member to maintain said abutment in place between said ports.

3. Rotary fluid displacement apparatus comprising: a housing having a pair of adjacent ports; a pair of generally cylindrical coaxially spaced apart members in opposite ends of said housing formed with ports in registration with said ports of said housing; a rotor journaled in said pair of members that is formed with a pair of confronting complementary impeller cam faces around a shaft of said rotor between which said ports are disposed; an abutment mounting member around said rotor shaft between said cam faces to define a pair of work chambers each of which is defined between one of said cam faces and one of the axially opposite ends of said mounting member, each of said cam faces having a plurality of lobes adapted to radially divide one of said chambers into separate segmental compartments, said ports of said housing and of said generally cylindrical member having communication with both of said work chambers at the levels of both of the axially opposite ends of said mounting member whereby all of said ports are continuously open during rotation of said rotor, the lobes of each of said cam faces being spaced apart sufficiently such that when one of said lobes passes said blade, another of said lobes prevents direct passage of a motive fluid between said open ports; an abutment blade slidably supported by said mounting member between said ports and having an engagement at both of its ends with both said impeller cam faces adapted to translate rotation of said rotor into reciprocation of said blade axially of said rotor, said blade being adapted to radially divide each of said compartments as said compartments pass from one to the other of said ports; and a ring portion of said mounting member clamped between the confronting ends of said pair of members to hold said mounting member against angular displacement.

4. Rotary fluid displacement apparatus comprising: a housing having a pair of adjacent ports; a pair of generally cylindrical coaxially spaced apart members in opposite ends of said housing formed with ports in registration with said ports of said housing; a pair of bearings each of which is coaxially mounted in one of said pair of members; each of said bearings having an outer race fixed in said one member to rotatably support an inner race of said bearing; a rotor mounted in said inner races of said bearings that is formed with a pair of confronting complementary impeller cam faces around a shaft of said rotor between which faces said ports are disposed; an abutment mounting member around said rotor shaft between said cam faces to define a pair of work chambers between said cam faces and the axially opposite ends of said mounting member, each of said cam faces having a plurality of lobes adapted to divide one of said chambers into separate segmental compartments, said ports of said housing and of said generally cylindrical member having communication with both of said work chambers at the levels of both of the axially opposite ends of said mounting member whereby all of said ports are continuously open during rotation of said rotor, the lobes of each of said cam faces being spaced apart sufficiently such that when one of said lobes passes said blade, another of said lobes prevents direct passage of a motive fluid between said open ports; an abutment blade slidably supported by said mounting member between said ports and having an engagement with both of said cam faces adapted to translate rotation of said rotor into reciprocation of said blade axially of said rotor, said blade being adapted to radially divide each of said compartments as said compartments pass from one to the other of said ports; and a ring portion of said mounting member clamped between the confronting ends of said pair of members to hold said mounting member and blade against angular displacement.

5. Rotary fluid displacement apparatus comprising: a housing; a rotor mounted in said housing and formed with a spaced pair of complementary impeller cam faces around a shaft of said rotor, each of said cam faces having a plurality of lobes; abutment mounting means secured in said housing coaxially with said shaft of said rotor said mounting means having a spaced pair of flat faces disposed normally to the axis of said rotor, each of which faces has radial line contacts with lobes of one of said cam faces; an abutment blade slidably supported by said mounting member radially with respect to the shaft of said rotor for reciprocation axially of said rotor, said blade having camming engagement with said pair of impeller cam faces whereby rotation of said rotor causes reciprocal movement of said blade; a pair of ports in said housing immediately adjacent to and on opposite sides of said blade, each of said ports having communication with the faces of said support means at least at the level of said faces whereby said ports are continuously open throughout rotation of said rotor, the lobes of each of said cam faces being spaced apart sufficiently such that when one of said lobes passes said blade, another of said lobe prevents direct passage of a motive fluid between said open ports; and pressure relief passage means for both said faces of said mounting means and on both sides of said abutment blade to extend from said blade to said ports.

6. Rotary fluid displacement apparatus comprising: a housing; a rotor mounted in said housing and formed with a spaced pair of complementary, plural-lobe, impeller cam faces around a shaft of said rotor; abutment mounting means secured in said housing coaxially with said shaft of said rotor, said mounting means having a spaced pair of flat faces disposed normally to the axis of said rotor, each of said flat faces having radial line contacts with lobes of one of said cam faces; an abutment blade slidably supported by said mounting means radially with respect to the shaft of said rotor for reciprocation of said blade axially of said rotor, said blade having camming engagement with said pair of impeller cam faces whereby rotation of said rotor causes reciprocal movement of said blade; a pair of ports in said housing immediately adjacent to and on opposite sides of said blade, each of said ports having communication with said flat faces of said support means at least at the level of said flat faces whereby said ports are continuously open throughout rotation of said rotor, the lobes of each of said cam faces being spaced apart sufficiently such that when one of said lobes passes said blade, another of said lobes prevents direct passage of a motive fluid between said open ports; and pressure relief passage means for both said flat faces of said mounting means and on at least one side of said abutment blade and adapted for establishing communication between at least one side of said blade and the port on the same side of said blade.

(References on following page)

References Cited in the file of this patent

UNITED STATES PATENTS

| | | |
|---|---|---|
| 805,140 | Jarvis | Nov. 21, 1905 |
| 878,600 | Berrenberg | Feb. 11, 1908 |
| 972,559 | Monnot | Oct. 11, 1910 |
| 1,172,692 | Fanning | Feb. 22, 1916 |
| 1,238,501 | Ernst | Aug. 28, 1917 |
| 1,241,624 | Guy | Oct. 2, 1917 |
| 1,686,767 | Saxon | Oct. 9, 1928 |
| 1,690,727 | Jaworowski | Nov. 6, 1928 |
| 1,690,728 | Jaworowski | Nov. 6, 1928 |
| 1,936,467 | Deubel | Nov. 21, 1933 |
| 1,947,902 | De Stoutz | Feb. 20, 1934 |
| 1,991,764 | Lovgren | Feb. 19, 1935 |
| 2,018,692 | Waite | Oct. 29, 1935 |
| 2,029,520 | Carey | Feb. 4, 1936 |
| 2,071,672 | Whitcomb | Feb. 23, 1937 |
| 2,112,770 | Gleason | Mar. 29, 1938 |
| 2,180,993 | Monnier | Nov. 21, 1939 |
| 2,248,452 | Erickson | July 8, 1941 |
| 2,351,943 | Ebbers et al. | June 20, 1944 |
| 2,373,442 | Angell | Apr. 10, 1945 |
| 2,869,472 | Hartmann | Jan. 20, 1959 |
| 2,881,517 | Carpenter et al. | Apr. 14, 1959 |
| 2,895,738 | Baker | July 21, 1959 |
| 2,897,596 | Maurer | Aug. 4, 1959 |
| 2,925,779 | Pelladeau | Feb. 23, 1960 |
| 2,948,230 | Shelton | Aug. 9, 1960 |
| 2,957,429 | Fisk | Oct. 25, 1960 |

FOREIGN PATENTS

| | | |
|---|---|---|
| 219,562 | Australia | Jan. 13, 1959 |